Dec. 5, 1933.  R. V. HUTCHINSON  1,937,961
WHEEL TRUING DEVICE
Filed July 29, 1929   4 Sheets-Sheet 1
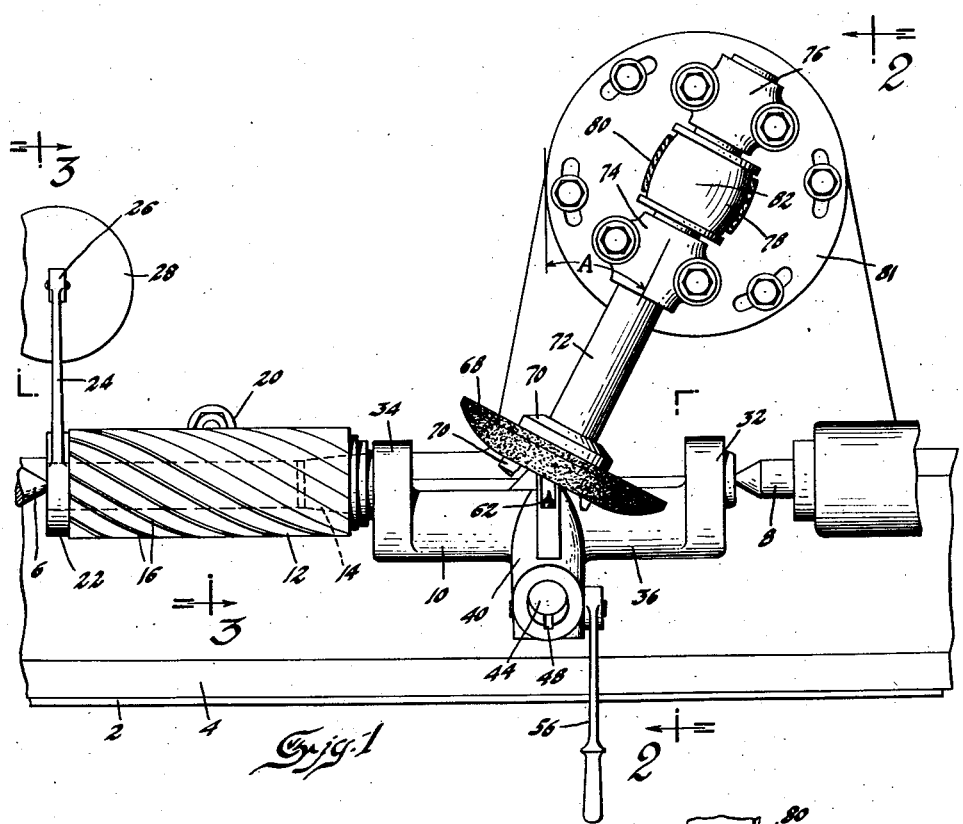
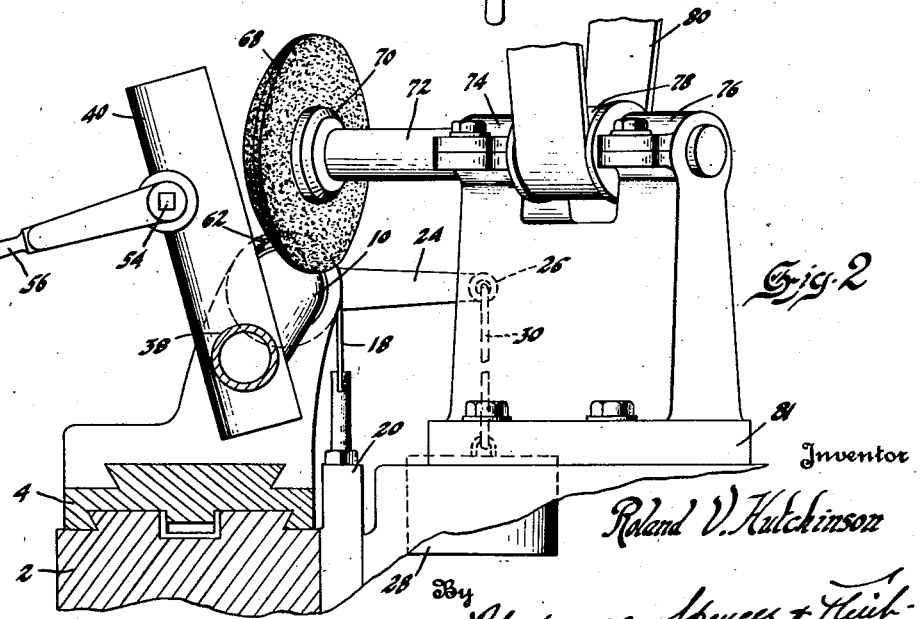

Dec. 5, 1933.      R. V. HUTCHINSON      1,937,961
WHEEL TRUING DEVICE
Filed July 29, 1929      4 Sheets-Sheet 2
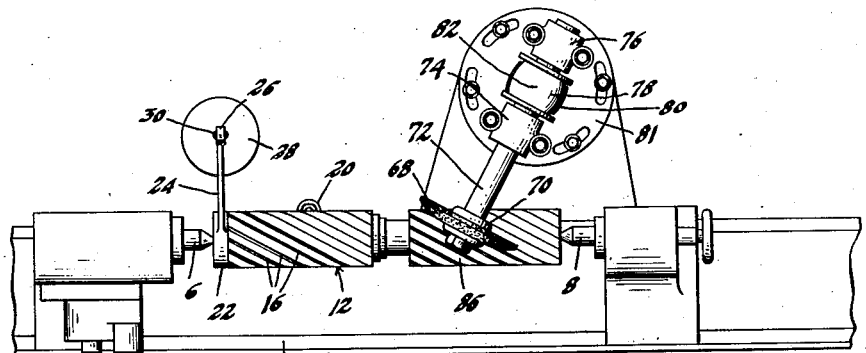
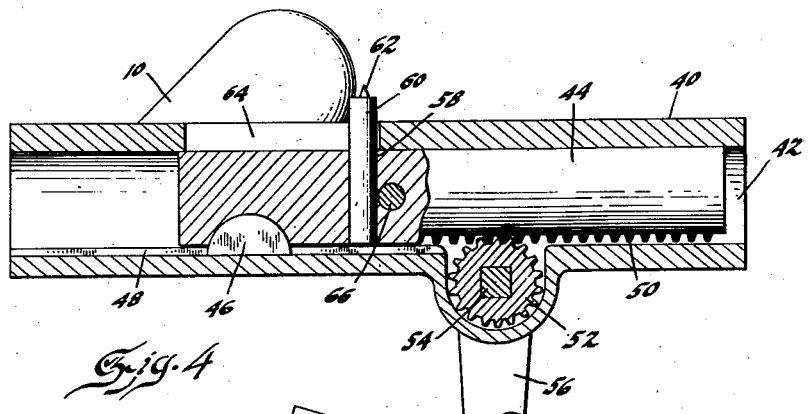
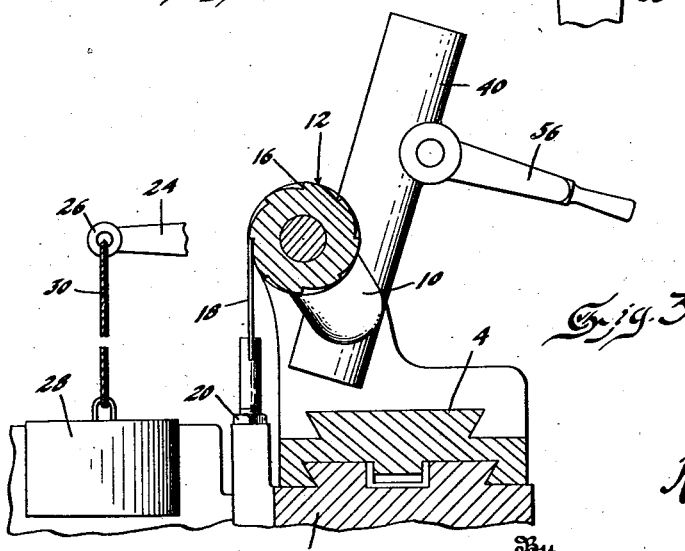
Inventor
Roland V. Hutchinson
By Blackmore, Spencer & Flink
Attorneys Dec. 5, 1933.  R. V. HUTCHINSON  1,937,961
WHEEL TRUING DEVICE
Filed July 29, 1929  4 Sheets-Sheet 3
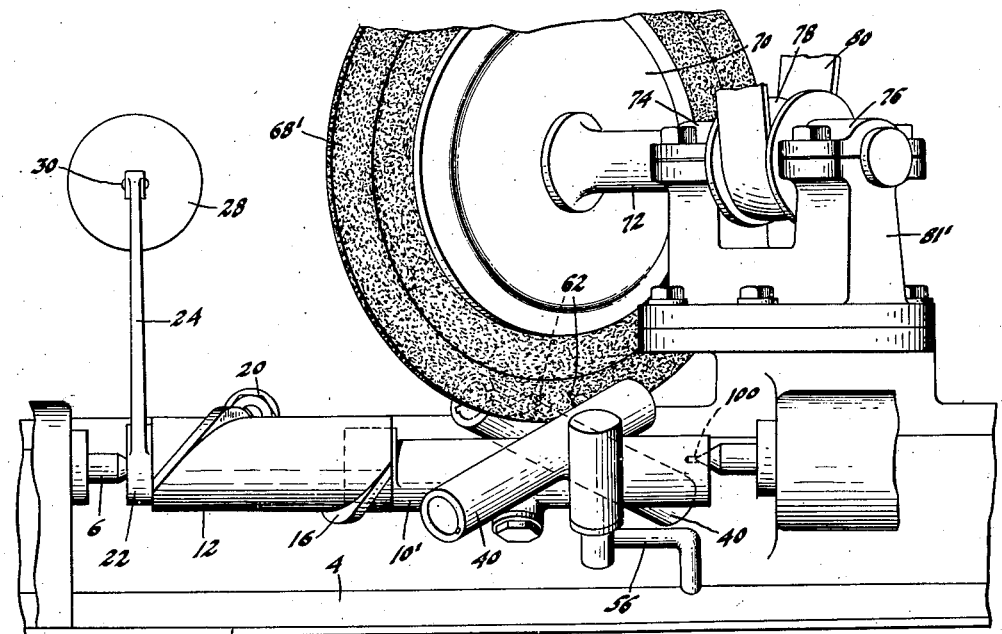
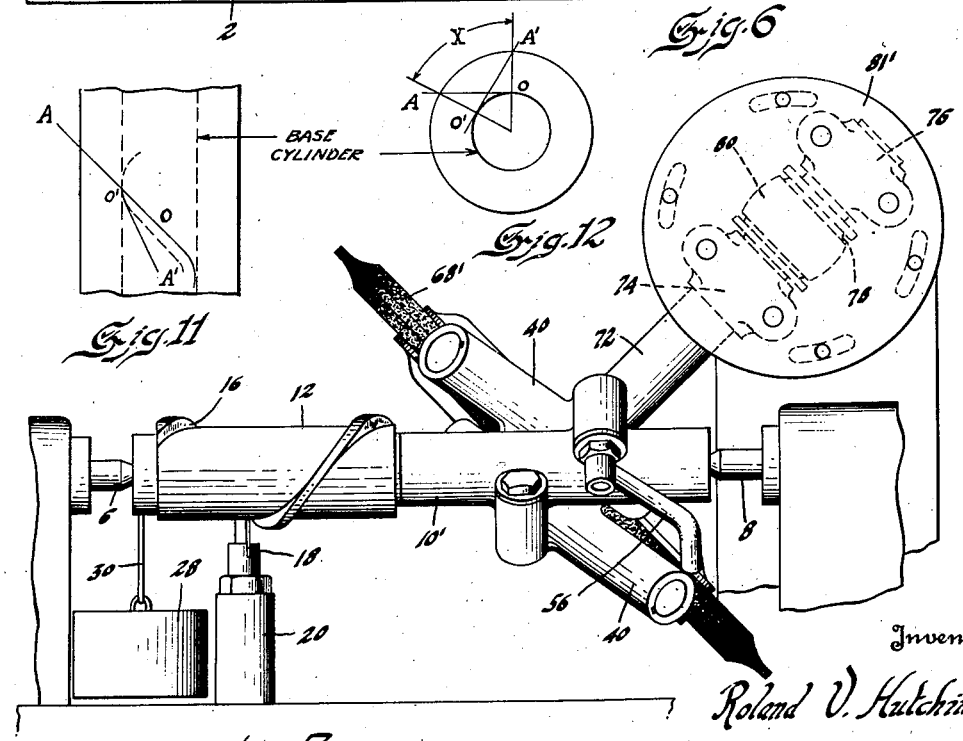
Inventor
Roland V. Hutchinson

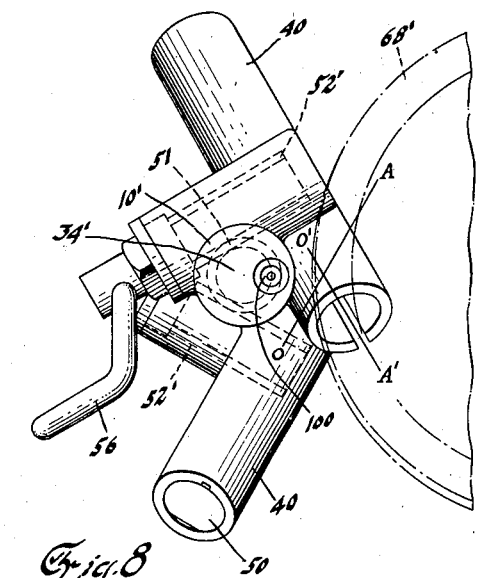
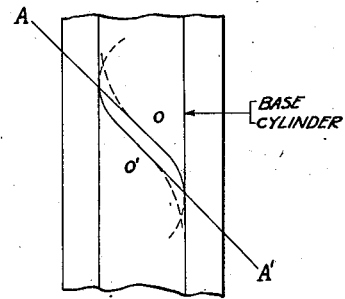
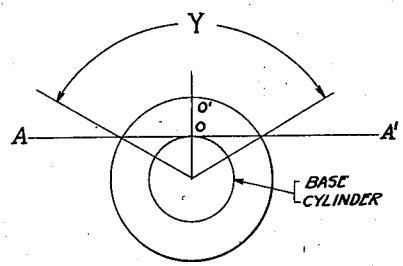
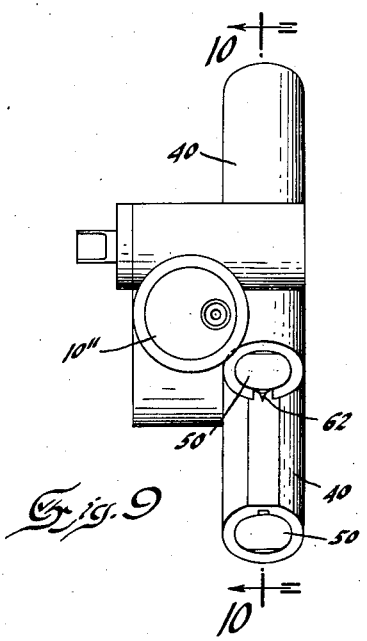
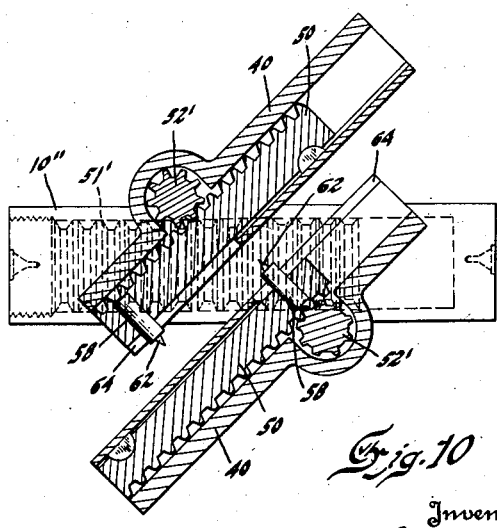

Patented Dec. 5, 1933

1,937,961

UNITED STATES PATENT OFFICE 1,937,961

WHEEL TRUING DEVICE

Roland V. Hutchinson, Lansing, Mich., assignor to General Motors Corporation, Detroit, Mich., a corporation of Delaware Application July 29, 1929. Serial No. 381,929

14 Claims. (Cl. 125—11)

This invention relates to wheel truning devices and has particular reference to means for truing grinding wheels so that they will produce predetermined helicoidal surfaces either singly or in multiple. The invention is adaptable therefore to being used in the production of worms, and the sharpening of hobs and the faces of helicoidally gashed milling cutters and hobs.

Considering helicoidal surfaces as used for worms, there are three usual types with straight line generatrices, two of which are special cases of the first.

First is the convolute helicoid, which is a helicoidal surface formed by screwing a straight line generatrix around an axis, the straight line being tangent to a cylinder concentric with the axis, and inclined to the axis at any angle.

Second is the screw helicoid, which is the special case of the above which occurs when there is no tangent cylinder, and the generatrix intersects the axis. In this case, one end point of the generatrix slides along the axis while the generatrix itself is screwed around the axis.

If the generatrix is normal to the axis, then the surface generated is what is commonly known as "helicoidal."

The generatrix, however, may again be inclined at any angle to axis, provided it intersects the axis.

Third is the involute helicoidal surface. This is formed by a straight line generatrix screwed around an axis, and tangent to a cylinder concentric to this axis. The inclination of the generatrix is such that it is the tangential continuation of the helix described by the point of the generatrix that touches the concentric cylinder.

In all three of the surfaces ruled out, the angular and axial velocities of the generatrix with respect to the axis are uniform, not variable.

If a mechanism is provided to cause the dressing diamond or diamonds to sweep out the helicoidal faces to be produced and the grinding surface of the grinding wheel be dressed or turned by such motion of the diamond, then the wheel grinding or cutting surface produced will be that surface of revolution tangent to the desired helicoid and will produce or grind such helicoidal surfaces (regardless of angular settings or variations in diameter of wheels) provided grinding wheel dressing centers and angles are duplicated in using the dressed wheel on the work. In this manner involute or screw helicoidal worms may be produced by grinding with the periphery of the wheel and the surface finish improved, and also both sides of the worm thread may be simultaneously ground.

It is fundamental, in producing any profile by the use of a grinding wheel, that the grinding wheel used must be tangent to the surface to be produced.

This fact is recognized and utilized in the Brown Patent Number 1,415,016, May 9, 1922, where the flat face of a grinding wheel disk is used to grind the thread shape. This flat face is the tangent plane and the surface produced is an involute helicoid, and the line of contact is the generatrix of the surface.

However, the limitation, in manufacture, of this method is that the worm must be turned end for end in order that both sides of the groove may be rectified.

It is an object of this invention to provide means of producing a series of grinding wheels which are not plane, but which are solids of revolution tangent to the helicoidal surfaces to be produced. Thus, we shall be able to grind involute helicoidal worms on both sides simultaneously, at a more rapid rate than at present. However, to produce continuously accurate work as the grinding wheel is reduced in size by dressing, it is necessary that the curvature of the radial axial section of the emery wheel change as its diameter is reduced.

In the case of the production of worms having helicoidal surfaces with straight line generatrices, the wheel shape is in general, the solid of revolution bounded by a family of hyperboloids of revolution, ruled by the successive generatrices of the worm.

The manner in which the above result is accomplished is as follows: The dressing diamond is made to reciprocate along the generatrix of the surface to be produced. The emery wheel is rotated, and the reciprocating diamond screwed past the emery wheel. If the screwing motion be made step by step, then the diamond rules out a series of generatrices of the helicoid to be produced. If the diamond simultaneously dresses the wheel, it turns the wheel to a series of hyperboloidal shapes, changing at each step. This series of hyperboloids is the envelope of the emery wheel which is tangent to and which will reproduce the desired helicoidal surface.

Alternatively, the diamond may be screwed past the emery wheel and slid along the generatrix line step by step, or the screwing and sliding may be continuous, not intermittent, motions.

In any event the diamond rules out the surface to be produced and removes that portion of the emery wheel that would encroach on such surface or surfaces, regardless of whether the generatrix be straight or curved.

Now in grinding both involute and screw helicoidal worms, two diamonds will be used. For grinding milling cutters and sharpening hobs, where only a series of single helicoidal surfaces are involved, only one diamond need be used.

The presently described dresser makes a theoretically accurate wheel for sharpening hobs.

One way of accomplishing the object of the invention is by positioning between adjustable head and tail stocks mounted on a slidable table a fixture provided with a means for holding and manually or mechanically reciprocating a dressing diamond or diamonds. A helical guide is mounted axially with the fixture and the rotation of both is controlled by means of a stationary spring finger which engages the helix of the guide. A weight attached to the fixture or to the guide constantly urges both to rotate in one direction, but this rotation is controlled by the engagement of the spring finger with the helix of the guide. A grinding wheel or a grinding wheel blank is adjustably mounted and secured to a rotatable shaft and is adapted to project into the path of the diamonds. The sliding of the table causes the finger to slide over the helix of the guide to permit the rotation of the guide and fixture and bring the diamonds into the grinding wheel. When a diamond first strikes the grinding wheel it is reciprocated back and forth to dress off a portion of the wheel. The path of the reciprocated diamond is on a line of the generatrix of the helicoid of the worm to be ground or hob to be sharpened. The table containing the head and tail stocks is shifted step by step a short distance and owing to the fact that the helix of the guide will slide over the spring finger the fixture and guide are simultaneously permitted to rotate through a small arc. For each new position the diamonds are again reciprocated to cause them to sweep out an additional portion of the grinding wheel, the diamond, of course, reciprocating on a new position of the generatrix. This step-by-step movement or shifting of the table is continued until the diamonds have swept out the entire surface to be produced from the grinding wheel. The shape of the surface, will, of course, jointly depend upon the shape of the helix on the guide, and the linear path of the diamond with respect to the axis of the fixture.

Thus, the emery wheel becomes that solid of revolution enveloped by a family of hyperboloids of revolution, each generated by the diamond moving along the successive generatrices and at the same time acting as the generatrices of the successive members of the family of hyperboloids.

If the fixture containing the diamond is now removed and a screw helicoidal worm placed between the centers along with the same helical guide and the same interrelationship of axial and rotational movement, the grinding wheel will accurately grind the surface of the helicoid for the reason that the solid of revolution generated by the dressing diamond is tangent to the helicoidal surface to be ground.

On the drawings:

Fig. 1 is a plan view of the wheel truing device, arranged on a cutter grinding machine for truing wheels for sharpening hobs.

Fig. 2 is an end view taken on the line 2—2 of Fig. 1.

Fig. 3 is an end view of the device taken on the line 3—3 of Fig. 1.

Fig. 4 is a sectional view through the diamond holder.

Fig. 5 is a view similar to Fig. 1 but with a helicoidally gashed cutter to be sharpened by grinding the face of its teeth substituted for the fixture.

Fig. 6 is a plan view of a modification showing diamonds for simultaneously dressing both sides of the wheel, when producing involute helicoidal worm surfaces.

Fig. 7 is a front or side view of the structure of Fig. 6.

Fig. 8 is an end view of the diamond holders of Figs. 6 and 7.

Fig. 9 is a view corresponding to Fig. 8 of a modification.

Fig. 10 is a section on the line 10—10 of Fig. 9.

Figs. 11 and 12 show in plan and side views the positions of the generatrices along which the diamonds operate corresponding to the structure of Fig. 6.

Figs. 13 and 14 show in plan and side views of the position of the generatrices along which the diamonds operate corresponding to Figs. 9 and 10.

Referring to the drawings, the numeral 2 indicates the bed of a suitable machine. The bed is provided with the slidable or shiftable table 4 on which there is mounted the head stock 6 and the tail stock 8. The means for sliding the table is not shown for the reason that it is conventional and per se forms no part of the invention. Between the head and tail stocks there is mounted the fixture 10 and the helical guide 12 which are separable and are held together in the machine by means of interengagement of the interfitting conical portions shown at 14. If desired a key and key way connection may be provided. When the head and tail stocks are separated the fixture and guide 12 may be removed from the machine. The fixture and guide are also relatively separable.

The guide 12 has the helical outer surface or periphery 16 as shown in Figs. 1, 3 and 5. A spring finger 18 rigidly mounted as at 20 to the bed 2 engages with the helix 16 and prevents the guide and fixture from rotating in one direction. One end of the guide 12 is provided with the end plate 22 having an integral arm 24 provided with an eye 26 at its end. A weight 28 is suspended in the eye 26 by means of a suitable rope or cable 30, which urges the helical guide to rotate.

The fixture 10 is shaped into the form of a yoke as is best shown in Figs. 1, 2 and 3. The yoke includes the arms 32 and 34 and the connecting member 36. Rigidly mounted on or integral with the connecting member 36 as at 38 is a holder 40. The holder is hollow as shown at 42 in Fig. 4 and has mounted therein the reciprocable member 44. The member 44 is provided with the key 46 which slides on a groove 48 on the interior of the holder 40. A rack 50 formed on one side of the reciprocable member 44 meshes with the gear 52 operated from an axle 54 by means of a manually operable handle 56. The member 44 is provided with an opening 58 adapted to receive a diamond holder 60 in the end of which the diamond 62 is mounted. A slot 64 is provided in the holder 40 to allow for the movement of the diamond when the handle 56 is operated to reciprocate the member 44. A tapered pin 66 is used to hold the diamond 62 and holder 60 in adjusted position.

The grinding wheel or grinding wheel blank is shown at 68 and is held by means of flanges 70 on the shaft 72 in the conventional manner. The shaft 72 is adjustably mounted in bearings 74 and 76, rigidly held on an adjustable and swivelled mounting 81 on the bed 2 of the machine. A pulley 78 is removably secured to the shaft and is driven by a belt 80 operated from a suitable source of power.

In positioning the shaft 72 and the grinding wheel 68 the angle indicated at A corresponds to the angle of the helix on the work to be ground. In other words, there is a definite relation between the lead of the helix on the helicoidal guide 12 and the angle A, formed by the center line of the shaft 72 and the perpendicular to the center lines of the head and tail stocks. The lead and hand of the helical guide is the same as that of the work to be ground.

The grinding wheel head may be swung around the vertical axis passing through 82, to suit left hand helicoids. As shown, the wheel is set to finally grind right hand helicoidal faces. This use of removable guides is known already in the art.

By referring to Figs. 1, 2 and 3, it will be noted that the grinding or emery wheel 68 is positioned so as to come in the path of the diamond 62. When the wheel and diamond first come in contact, the handle 56 is reciprocated to cause the diamond to move on a line corresponding to the generatrix of the helicoid to be produced. The diamond will turn off a portion of the grinding wheel generating upon it a hyperboloidal shape. The table is then shifted a short distance, which will cause a corresponding shifting of the helical guide 12 and fixture 10 and during this shifting movement the guide and fixture will be rotated by the weight 28 owing to the fact that the helix 16 will slip over or slide along the finger 18. This will bring the diamond 62 to a new position or on a new line or generatrix and by operating the handle 56 the diamond will be caused to move back and forth on the new line or generatrix to remove or turn off an additional portion of the emery wheel. As these movements continue the diamond will ultimately remove all the excess parts of the emery wheel and what remains will be a solid of revolution tangent to the helicoidal surface ruled out by the diamond.

If now the axes of the emery wheel 68 and of the helix 16 are unchanged in space and the fixture (or the diamond holding device) 10 replaced by a cutter or hob to be sharpened, then if the work is given the same relative rotation and axial translation as that of the diamond during the dressing process, only one surface can be produced by the emery wheel, namely the helicoidal surface ruled out originally. This is shown in Fig. 5 in which the cutter 86 has been substituted for the fixture 10. The finished grinding wheel 68 is shown as operated on the helicoidal cutting face of the milling cutter 86. As the helix 16 of the helical guide 12 and the helix of the cutter 86 have the same lead and hand the wheel 68 will accurately grind or finish the face of the cutter 86.

It is possible to have as many different types of helicoidal surfaces as may be desired, depending entirely upon the shape of the generatrix and the ratio of its rate of axial movement to its rate of rotation, or in other words its lead. The generatrices are varied by using suitable diamond holders; the leads and hands are varied by changing the guides. It is recognized that the lead and hand of the helicoids may be controlled also by change gears and screw or rack feed to the table as is old in the art.

In accordance with the invention it is proposed to utilize for gearing purposes the generatrices which are most easily produced either by straight line movements, or movements in arcs of circles. Then by making the dressing diamond reciprocate over these generatrices and at the same time rotate about the helicoid axis and simultaneously move lengthwise with respect to said axis, it is possible to generate any grinding wheel tangent to the desired helicoidal surface it is desired to grind, and may even by the use of two diamonds generate or sweep out a wheel which will simultaneously grind both sides of the groove of the worms.

The drawings (Figs. 1 to 5 inclusive) show the invention arranged for dressing saucer wheels for grinding screw helicoids with generatrices normal to the axis such as are encountered in sharpening the faces of hob teeth.

The step-by-step movement of the diamond may be either axial or radial, depending on external conditions. Either will work with great accuracy.

First of all, only axially gashed hobs may be correctly sharpened by grinding the tooth faces with the flat side of a saucer wheel. In sharpening helicoidally gashed hobs, the shape of emery wheel needed is one that is tangent to the helicoidal surface of the tooth faces. This shape in general can only be produced by having the dressing diamond sweep over such helicoidal surface. The attached drawings (Figs. 1 to 5 inclusive) show such a type of dressing fixture arranged for producing, on an ordinary cutter grinder, such as the small Le Blond or Norton machines, a series of emery wheels tangent to screw helicoids having radial generatrices. After the wheels are dressed the hob itself is substituted for the dressing fixture. The hob is then first fed up to the wheel by rotation about its own axis, not by translation of axes.

Should a raked hob of the helicoidally gashed type be sharpened, the obvious modification to the truing fixture as shown is to rearrange what is now the radial path of the diamond and change it to pass through the new generatrix and sweep out the proper tooth face conjugate helicoid.

When using the guide to sharpen the cutters or hobs, the several guiding surfaces are successively used, and the number of grooves in the guide is the same as or a multiple of the number of teeth in the cutter or hob being sharpened by grinding. Thus the guide acts not only as a helicoid guide but as an indexing device as well. This use is old in the art.

Figs. 6 to 8 inclusive show a second modification or the preferred form of the invention as applied to the production of involute helicoidal worms. The tailstocks 6 and 8 are the same as shown in the species of Figs. 1 and 5. The helical guide is shown at 12 and has the helix 16 on its periphery. The plate 22 appears at one end of the guide 12 and has secured thereto the arm 24, from the end of which the weight 28 is suspended by means of a rope or cable 30.

A spring finger is shown at 18 mounted as at 20 to the bed 2 of the machine. The end of the finger 18 engages in the groove of the helix 16 of the guide 12 similarly as described in connection with the species of Figs. 1 and 5.

The parts so far described are the same as those of Figs. 1 and 5 and the operation is the same.

The species of Figs. 6 to 8 inclusive differs from that of Figs. 1 and 2 in that the fixture 10' is provided with two holders 40, each having a diamond 62 which is adapted to be reciprocated along the generatrix of the helicoidal surface which it is desired to grind. The diamonds 62 are simultaneously reciprocated by the handle 56 in a similar manner as was described in connection with the species of the Figs. 1 and 2, save that the diamond slides are geared together so that oscillation of handle 56 reciprocates both diamonds. By referring to Fig. 8 it will be seen that each holder 40 is provided with a rather long gear 52' which meshes with the racks 50 in the holders and also with a slidable rack 51 mounted in the fixture 10' in the angle between the gears 52'. The operation of the handle 56 will therefore operate one of the gears 52' and through the rack 51 the second gear 52' will be moved to simultaneously operate the other diamond.

The fixture 10' has the arm 34' at one end and the offset center opening 100 at its opposite end. The offset opening 100 replaces the arm 32 of the yoke in the species shown in Fig. 1.

By referring to Figs. 6 and 7, it will be seen that the diamonds 62 are adapted to be simultaneously reciprocated by the handle 56 along a generatrix at the opposite sides of the worm groove and, therefore, shape on the grinding wheel 68' a surface which will be tangent or conjugate to the two sides of adjacent convolutions of the threads of the worm to be ground when the grinding wheel operates in the groove of the worm.

The operation of the structure of Figs. 6 to 8 inclusive is similar to that described in connection with the species of Figs. 1 and 2. The helical guide 12 is set so as to mate at one of its ends with the finger 18. With the parts in this position and the wheel 68' rotating, the handle 56 is operated to simultaneously reciprocate the diamonds 62 along the two generatrices to turn away a portion of the grinding wheel 68'. The table 2 is then shifted a short distance which will move the guide 12 and fixture 10' therewith. This movement will simultaneously cause a rotation of both guide and fixture owing to the fact that the finger 18 will slide in the helix 16 and permit the weight 28 to rotate the guide 12 and the fixture 10'. The handle 56 is now again operated to reciprocate the diamonds on new positions of the generatrices which will turn an additional portion from the two sides of the emery wheel 68. These operations are continued until the two sides of the wheel are shaped to the proper form. When the operation is completed, it will be apparent that a solid of revolution has been generated which when operating in the helicoidal groove of the work will be tangent to and simultaneously grind both sides. This grinding is accomplished by removing the fixture 10' and substituting therefor the work (hob or worm) and rotating the grinding wheel while screwing the work past it.

By referring to the species of Figs. 6 to 8 inclusive, it will be noted that the holders 40 are relatively inclined, or, in other words, are not in the same plane. The reason for this is illustrated in Figs. 11 and 12 in which the generatrices A—O and A'—O' correspond to the paths taken by the diamonds of the holders 40. From an examination of Fig. 12, it will be apparent that the angle through which the holders must swing is indicated by the letter "X".

The mounting of the grinding wheel 68' in Figs. 6 and 7 is slightly different than that shown in the species of Figs. 1 and 2, owing to the fact that it is necessary to reciprocate two diamonds instead of one. The swivel mounting 81' in Figs. 6 and 7 is mounted so as to hold the grinding wheel 68 downwardly and at an angle so that the edge of the wheel will strike the diamonds laterally and from the rear of the holder 10' instead of from the top of the holder 10 in Figure 1. The mounting 81' is capable of adjustment similarly as the mounting 81 in Fig. 1 to provide for proper hand and angle. In actual practice two swivelled mountings 81' are used and the grinding wheel 68' mounted on the shaft 72 intermediate or between the mounts 81'.

By referring to Figs. 9 and 10 inclusive, in which a modification of the species of Figs. 6 to 8 inclusive is shown, it will be evident that the holders 40 may be in the same plane and the diamonds 62 will, therefore, reciprocate in the same plane as indicated by the generatrices A—O and A'—O' in Figs. 13 and 14. In the species of Figs. 9 and 10, it will be necessary for the holders to swing through the angle indicated at Y in Fig. 14. For this reason, the mounting of the holders on the fixture 10' as shown in Figs. 6 to 8 inclusive is preferred as it is necessary to screw or rotate or swing the fixture 10'' through but half the angle. The species of Figs. 9 and 10 will work just as well as that of Figs. 6 to 8 inclusive, the single difference residing in the extent of the arc through which the fixture must be screwed or rotated to obtain a true grinding surface on both sides of the grinding wheel.

In Fig. 10 a rack 51' operates in the hollow fixture 10'' and meshes with both gears 52' so that the operation of one gear will operate the other through the rack 51'. An operating handle may be placed on either gear 52'.

Suppose it is desired to grind involute helicoidal worms. There are two generatrices of the two worm surfaces, which are to be the paths of the two diamonds. Figs. 11 to 14 inclusive show the involute helicoidal worm with the generatrices plainly marked.

In Figs. 13 and 14, the two generatrices shown are contained in the same plane. Therefore, in using a dressing attachment, to be sure that every part is covered, it is necessary to rotate the dresser through the big angle Y shown in Fig. 14.

Now since the generatrix for one side of the worm may be screwed along the axis with respect to the other generatrix, it is possible to reduce the angular movement of the dresser by making the end projection of each generatrix be in the same angular segment of the end view. The dresser is shown in one drawing with the two generatrices in the same plane—in the other with the operating angle reduced (as shown at X, Fig. 12) by screwing one past the other.

The provision for reducing the outside diameter of the wheel, as the sides are dressed, is the conventional diamond holder, set out so that the diamond is a definte distance out from the work axis. Then after the sides are dressed a few strokes of the outside dresser makes the wheel of the right diameter to correspond with the root or core diameter of the worm to be ground.

While removable guides are shown in the illustrations of the dresser as applied to the worm grinding case, it is obvious that when the type dresser described in this invention is used on commercial types of worm grinding machines, the dresser will be mounted between centers, replacing the work temporarily and the means for producing the proper lead of surface swept out will be the same as ordinarily built into the machine for producing the proper lead of worm.

I claim:

1. In a wheel truing device, a grinding wheel blank and means for rotating it, a fixture mounted adjacent said wheel on a reciprocable table, a diamond mounted on said fixture adjacent the wheel, a guide mounted with said fixture and having a helical surface, means engaging said helical surface to control the rotation of said fixture, the reciprocation of said table causing said helical surface to slide along said guide to rotate said fixture to cause said diamond to sweep out on said blank a shape tangential to a predetermined curved or helicoidal surface.

2. In a wheel truing device, a grinding wheel and means to rotate the same, a fixture mounted in a slidable table, a diamond mounted on said fixture, manual means for reciprocating said diamond, a guide mounted with said fixture having a helical surface, a finger engaging said helical surface to control the rotation of said fixture, the shifting of said table causing said helical surface to ride on said finger to rotate said fixture and cause said diamond to sweep out of said wheel a curved surface.

3. In a wheel truing device, an adjustably mounted grinding wheel and means to rotate it, a fixture mounted on a shiftable table adjacent said wheel, a diamond mounted on said fixture, means to manually move said diamond, a guide mounted with said fixture having a helical surface, a permanently mounted finger engaging said helical surface to control rotation of said guide and fixture, the shifting of said table causing said helical surface to ride on said finger to rotate said fixture and cause said diamond to sweep out on said wheel a shape tangent to a predetermined curved or helicoidal surface.

4. In a wheel truing device, an adjustably mounted grinding wheel and means to rotate it, a fixture mounted on a shiftable table adjacent said wheel, a diamond mounted on said fixture, means to manually shift said diamond, a guide mounted with said fixture having a helical surface, means constantly urging said guide to rotate in one direction, a permanently mounted finger engaging said helical surface to prevent said guide and fixture from rotating, the shifting of said table causing said helical surface to ride on said finger to rotate said fixture and cause said diamond to sweep out on said wheel a shape tangent to a predetermined curved or helicoidal surface.

5. In a wheel truing device, an adjustably mounted grinding wheel and means to rotate it, a fixture mounted on a shiftable table adjacent said wheel, a diamond mounted on said fixture, means to manually reciprocate said diamond, a guide mounted with said fixture having a helical surface, a weight constantly urging said guide to rotate in one direction, a permanently mounted finger engaging said helical surface to prevent said guide and fixture from rotating, the shifting of said table causing said helical surface to ride on said finger to rotate said fixture and cause said diamond when reciprocated to sweep out on said wheel a shape tangent to a predetermined curved or helicoidal surface.

6. In a wheel truing device, an adjustably mounted grinding wheel and means to rotate it, a fixture mounted adjacent said wheel on a slidable table, a guide mounted with said fixture and having a helical surface, a weight operatively connected with said guide and fixture and constantly urging them to rotate in one direction, a permanently mounted finger engaging said helical surface to prevent the rotation of said guide and fixture, a holder rigidly mounted on said fixture, a diamond reciprocably mounted in said holder adjacent said wheel, the shifting of said table causing said helical surface to ride on said finger to rotate said fixture and cause said diamond when reciprocated to sweep out on said wheel a shape tangent to a predetermined curved or helicoidal surface.

7. In a wheel truing device adapted to true grinding wheels to grind helicoidal surfaces, a grinding wheel and means to rotate the same, a fixture mounted adjacent said wheel in a reciprocable table, a diamond mounted on said fixture, means to reciprocate said diamond to cause it to move across the grinding surface of said wheel on the line of the generatrix of a helicoid, a guide mounted with said fixture, said guide having a helical surface, means urging said guide and fixture to rotate, means engaging said helical surface to prevent the rotation of said guide and fixture, the shifting of said table causing the helical surface of said guide to ride over said last named means to permit the rotation of said guide and fixture to cause said diamond to sweep out on said wheel a shape tangent to a predetermined curved or helicoidal surface of the same lead as that of the helical surface on said guide.

8. In a wheel truing device adapted to true grinding wheels to grind helicoidal surfaces, a grinding wheel and means to rotate the same, a fixture mounted adjacent said wheel in a reciprocable table, a diamond mounted on said fixture, means to reciprocate said diamond to cause it to move across the grinding surface of said wheel on the line of the generatrix of a helicoid, a guide mounted with said fixture, said guide having a helical surface, a weight urging said guide and fixture to rotate, a finger engaging said helical surface to prevent the rotation of said guide and fixture, the shifting of said table causing the helical surface of said guide to ride over said finger to permit the rotation of said guide and fixture to cause said diamond to sweep out on said wheel a shape tangent to the predetermined curved or helicoidal surface.

9. In a wheel truing device, a grinding wheel blank, means for rotating said blank, a removable fixture rotatably mounted adjacent said blank on a reciprocable table, means on said fixture to form on said blank a shape tangential to a predetermined curved or helicoidal surface, and a removable guide mounted on said device concentrically with and controlling the rotation of said fixture.

10. In a grinding wheel truing device having a reciprocable table, in combination, a fixture movably mounted on said table, a plurality of diamond holders secured to said fixture, a diamond in each holder, means for simultaneously reciprocating the diamonds in said holders to shape the wheel so that both its sides are tangent to predetermined curved or helicoidal surfaces, said diamonds moving on the lines of generatrices of said curved or helicoidal surface, means to control the movement of said fixture, said means operative upon reciprocation of said table to move said diamonds in the paths of new generatrices of the predetermined surfaces.

11. In a grinding wheel truing device having a reciprocable table, in combination, a fixture movably mounted on said table, a plurality of diamond holders mounted on said fixture in planes at an angle to each other, a diamond in each holder, means for simultaneously reciprocating the diamonds in said holders to shape the wheel so that both its sides are tangent to predetermined curved or helicoidal surfaces, said diamonds moving on the lines of generatrices of said curved or helicoidal surfaces, means to control the movement of said fixture, said means operative upon reciprocation of said table to move said diamonds in the paths of new generatrices of the predetermined surfaces.

12. In a wheel truing device having a table, a grinding wheel blank, means for rotating said blank, a removable fixture movably mounted adjacent said blank on said table, means on said fixture to form on both sides of said blank a shape tangential to predetermined curved or helicoidal surfaces, said means operating on generatrices, a removable guide mounted on said device, and means mounted on said device and cooperating with said guide to control the movement of said fixture, said means operative upon reciprocation of said table to move said diamonds in the paths of new generatrices of the predetermined surfaces.

13. In a wheel truing device, a grinding wheel blank, means for rotating said blank, a removable fixture rotatably mounted adjacent said blank on a reciprocable table, means on said fixture to form on said blank a shape tangential to a predetermined curved or helicoidal surface, said means operating on generatrices, a removable guide mounted on said device concentrically with said fixture, means cooperating with said guide to control the movement of said fixture, said means operative upon reciprocation of said table to move said diamonds in the paths of new generatrices of the predetermined surfaces.

14. In a grinding wheel truing device, having a table, a fixture movably mounted on said table, a plurality of diamond holders secured to said fixture, a diamond in each holder, means for simultaneously reciprocating the diamonds in said holders on generatrices to shape the wheel so that both its sides are tangent to predetermined curved or helicoidal surfaces, means to control the movement of said fixture, said means operative upon reciprocation of said table to move said diamonds in the paths of new generatrices of the predetermined surfaces, whereby the grinding wheel grinding surface is formed into the enveloping solid of a series of hyperbolas which will be tangent to the surface to be ground.

ROLAND V. HUTCHINSON.